United States Patent
Ghosh et al.

(10) Patent No.: US 11,080,108 B2
(45) Date of Patent: Aug. 3, 2021

(54) SYSTEM USING ADAPTIVE INTERRUPTS FOR CONTROLLING NOTIFICATIONS TO A USER

(71) Applicant: Dell Products L.P., Round Rock, TX (US)

(72) Inventors: Mahuya Ghosh, Hyderabad (IN); Donal Carpenter, Wicklow (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/670,528

(22) Filed: Oct. 31, 2019

(65) Prior Publication Data
US 2021/0133007 A1    May 6, 2021

(51) Int. Cl.
*G06F 9/54* (2006.01)
*G06F 3/01* (2006.01)
*G05B 13/02* (2006.01)

(52) U.S. Cl.
CPC ............. *G06F 9/542* (2013.01); *G05B 13/02* (2013.01); *G06F 3/011* (2013.01)

(58) Field of Classification Search
None
See application file for complete search history.

(56) References Cited

U.S. PATENT DOCUMENTS

| 2004/0030753 | A1* | 2/2004 | Horvitz |
| 2016/0037482 | A1* | 2/2016 | Higgins |
| 2018/0026920 | A1* | 1/2018 | Chen |
| 2018/0176885 | A1* | 6/2018 | VanBlon |

* cited by examiner

*Primary Examiner* — Syed A Roni
(74) *Attorney, Agent, or Firm* — Terrile, Cannatti & Chambers; Stephen A. Terrile

(57) ABSTRACT

A method, system and computer-usable medium are disclosed for implementing a machine learning system for using adaptive interrupts to control notifications to a user. In at least one embodiment, a computer-implemented method for adaptively interrupting a user with communication notifications at an information handling system is disclosed, including: receiving a communication for a user at the information handling system; intercepting a notification relating to the received communication; assessing a degree of importance of the notification using contextual information associated with the notification; assessing a degree of busyness of the user at the information handling system by actively monitoring interactions between the user and the information handling system; and selectively interrupting the user with the notification based on the busyness of the user at the information handling system and the degree of importance of the notification.

14 Claims, 7 Drawing Sheets

SYSTEM USING ADAPTIVE INTERRUPTS FOR CONTROLLING NOTIFICATIONS TO A USER

BACKGROUND OF THE INVENTION

Field of the Invention

The present invention relates to information handling systems. More specifically, embodiments of the invention relate to a system using adaptive interrupts for controlling notifications to a user.

Description of the Related Art

As the value and use of information continues to increase, individuals and businesses seek additional ways to process and store information. Options available to users include information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system of one or more computers can be configured to perform particular operations or actions by virtue of having software, firmware, hardware, or a combination of them installed on the system that in operation causes or cause the system using adaptive interrupts for controlling communication notifications to a user. At least one embodiment is directed to computer-implemented method for adaptively interrupting a user with communication notifications at an information handling system, including: receiving a communication for a user at the information handling system; intercepting a notification relating to the received communication; assessing a degree of importance of the notification using contextual information associated with the notification; assessing a degree of busyness of the user at the information handling system by actively monitoring interactions between the user and the information handling system; and selectively interrupting the user with the notification based on the busyness of the user at the information handling system and the degree of importance of the notification. Other embodiments of this aspect include corresponding computer systems, apparatus, and computer programs recorded on one or more computer storage devices, each configured to perform the actions of the methods.

At least one embodiment is directed to system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: receiving a communication for a user at an information handling system; intercepting a notification relating to the received communication; assessing a degree of importance of the notification using contextual information associated with the notification; assessing a degree of busyness of the user at the information handling system by actively monitoring interactions between the user and the information handling system; and selectively interrupting the user with the notification based on the busyness of the user at the information handling system and the degree of importance of the notification.

At least one embodiment is directed to a non-transitory, computer-readable storage medium embodying computer program code, the computer program code including computer executable instructions configured for: receiving a communication for a user at an information handling system; intercepting a notification relating to the received communication; assessing a degree of importance of the notification using contextual information associated with the notification; assessing a degree of busyness of the user at the information handling system by actively monitoring interactions between the user and the information handling system; and selectively interrupting the user with the notification based on the busyness of the user at the information handling system and the degree of importance of the notification.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
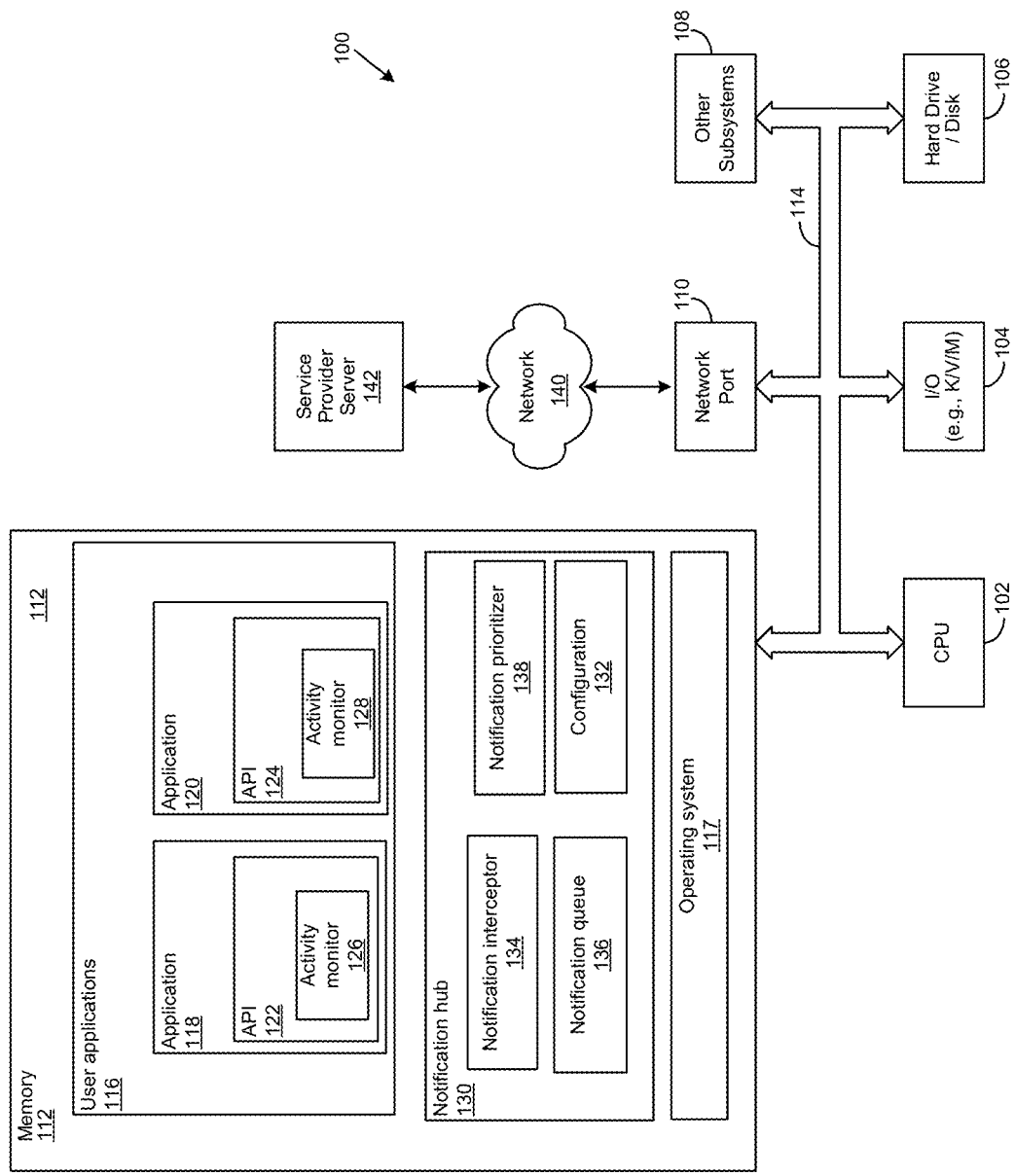
FIG. 1 is a generalized illustration of an information handling system 100 that is configured to implement certain embodiments of the system and method of the present disclosure.

A system, method, and computer-readable medium are disclosed for using adaptively interrupting a user with communication notifications at a user's information handling system. Certain aspects of the invention reflect an appreciation that certain communication notification systems approach notification of the user using an all or nothing approach. As an example, certain communication notification systems incorporate a do not disturb mode in which all inbound notifications and calendar reminders are blocked. When the do not disturb mode is disabled, however, notifications for all inbound communications are provided to the user, frequently distracting the user to the point of a reduction in worker productivity. In certain mobile phone embodiments, a do not disturb mode is automatically enabled while the user is driving. Certain aspects of the disclosure recognize that there are substantial disadvantages to the all or nothing notification approach.

In contrast to the all or nothing notification approach, certain embodiments of the disclosed system selectively interrupt a user with a notification of a received communication based on how busy the user is at the information handling system and the context of the received communication. In certain embodiments, an assessment of how busy the user is at the information handling system may be obtained by actively monitoring interactions between the user and applications, such as productivity applications, executed by the user at the information handling system. In certain embodiments, the assessment of how busy the user is at the information handling system may be expressed as an activity score where, for example, larger activity scores correspond to higher degrees of busyness. In certain embodiments, the context of the received communication may be obtained from, for example, one or more of an identification of the sender, the time of the communication, and identification of the application generating the notification, etc. In certain embodiments, the context information is compared with one or more constraints to assign, for example, a context priority score to the notification, where the context priority score is indicative of the importance of the notification. In certain embodiments, the context priority score is consolidated with the activity score to derive a notification interrupt score. In certain embodiments, the user is interrupted with the notification if the interrupt score meets a threshold.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that is configured to implement certain embodiments of the system and method of the present disclosure. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 117 and in various embodiments may also comprise other software modules and engines configured to implement certain embodiments of the disclosed system.

In certain embodiments, memory 112 includes storage for execution of a plurality of user applications 116. The user applications 116 may include conferencing applications (for example, Skype™, ZOOM™, etc.), communication applications (for example, Microsoft Outlook™, and/or other email applications), productivity applications (for example, Microsoft Word, Excel, etc.), video editing/playback programs, image editing programs, programming development environments, web browsers, etc. It will be recognized, in view of the teachings of the present disclosure, that user applications 116 may encompass a wide range of application types, the foregoing being non-limiting examples.

In certain embodiments, at least some of the user applications 116 include Application Programming Interfaces (APIs). In the example shown in FIG. 1, the user applications 116 include application 118 and application 120, each having respective APIs 122 and 124. APIs 122 and 124 include respective activity monitors 126 and 128 that are configured to detect the level of interaction (current and/or predicted interaction) between the user and the respective applications 118 and 120. For example, an API for a Visual Studio or other IDE programming development application may track keyboard activity of the user, where detection of a larger number of keystrokes and/or keystrokes per unit time indicate that the user is busier than when a fewer number of keystrokes and/or keystrokes per unit time are detected. In another example, an API for a Datacenter monitoring application may track critical issues and determine whether the user is or will be busy addressing such critical issues. In another example, an API for a word processing application may track keyboard activity and/or track the number of open word processing windows, where a larger number of open windows is used to indicate a higher level of busyness than a lower number of open windows. In another example, an API for an email application may determine that a user is in the middle of responding to an email or generating an email indicating a degree of user busyness that is greater for the email application than when the email application is merely executing monitoring operations to detect received emails. Various other application/API combinations may be used to determine the degree of busyness of the user, the foregoing being non-limiting examples.

In at least one embodiment, user busyness information is provided from the APIs 122, 124 to a notification hub 130. In at least one embodiment, the APIs 122, 124 and notification hub 130 cooperate to selectively provide users of the information handling system 100 with notifications generated by respective applications 118 and 120 in an adaptive manner based on the degree of busyness of the user at the information handling system number 100 and the importance of the notification as determined by an assessment of the context of the notification.

In the example shown in FIG. 1, notification hub 130 includes a configuration module 132 that registers the APIs, exposes named pipes for the interprocess communications for the APIs, expose protocol contracts, etc. In certain embodiments, the configuration model may set up interprocess communications using shared memory, unnamed pipes, sockets, or other interprocess communication methodologies.

In at least one embodiment, the notification hub 130 includes a notification interceptor 134. The notification interceptor 134 is configured to intercept notifications generated by the user applications 116. As an example, notification interceptor 134 may intercept an email notification that is generated by an application in response to receipt of an email. As another example, notification interceptor 134 may intercept notifications generated by conferencing applications. In certain embodiments, the manner in which the notification is intercepted is dependent on the type of application and/or the operating system used by the information handling system 100. In one example, the notification interceptor 134 may intercept calls that the user applications 116 make to the Windows Notification System. Notifications intercepted by the notification interceptor do not interrupt the user unless certain criterion are met, as disclosed herein.

Certain embodiments of the notification hub 130 include a notification queue 136. In at least one embodiment, the notification queue 136 stores information relating to the notifications intercepted by the notification interceptor 134. In certain embodiments, the information in the notification queue 136 includes context information for the intercepted notification such as the originator of a communication resulting in the notification, the time of the intercepted notification, the application generating the notification, the recipients of the communication generating the notification, etc.

The example of the notification hub 130 shown in FIG. 1 also includes a notification prioritizer 138. In at least one embodiment, the notification prioritizer 138 assesses the busyness of the user based on information provided by activity monitors 126 and 128. The notification prioritizer 138 of certain embodiments is also configured to assess the importance of the intercepted notification based on context information associated with the intercepted notification. In certain embodiments, the notification prioritizer 138 employs at least some of the information stored in the notification queue 136 to assess notification importance. In one example, an intercepted notification associated with a communication received from one individual may be assessed with a higher importance than an intercepted notification associated with a communication received from another individual. In another example, the importance of an intercepted notification received from a scheduling application may be assessed based on the type of scheduled activity, the time of the activity, the recipients of the communication, etc. Based on the teachings of the present disclosure, it will be recognized that there are various manners in which the importance of a notification may be assessed by the notification prioritizer 138 based on the context of the intercepted notification, the foregoing merely describing several non-limiting examples.

When an intercepted notification fails to meet a notification threshold as determined by the notification prioritizer 138, the intercepted notification is not allowed to interrupt the user. However, when an intercepted notification meets a notification threshold as determined by the notification prioritizer 138, the intercepted notification is allowed to interrupt the user. Interruption of the user with the notification may be undertaken in a number of different manners. In one example, the notification hub 130 may operate as a stand-alone program that passes the notification to the user without the need to further engage the application that originally generated the notification. In another example, the notification hub 130 may pass the intercepted notification to the application that originally generated the notification through the API associated with the original notification. In certain embodiments, the API for the application generating the notification may retain the notification in a local notification queue, and subsequently interrupt the user in response to an interruption authorization received from the notification hub.

Figure 2:
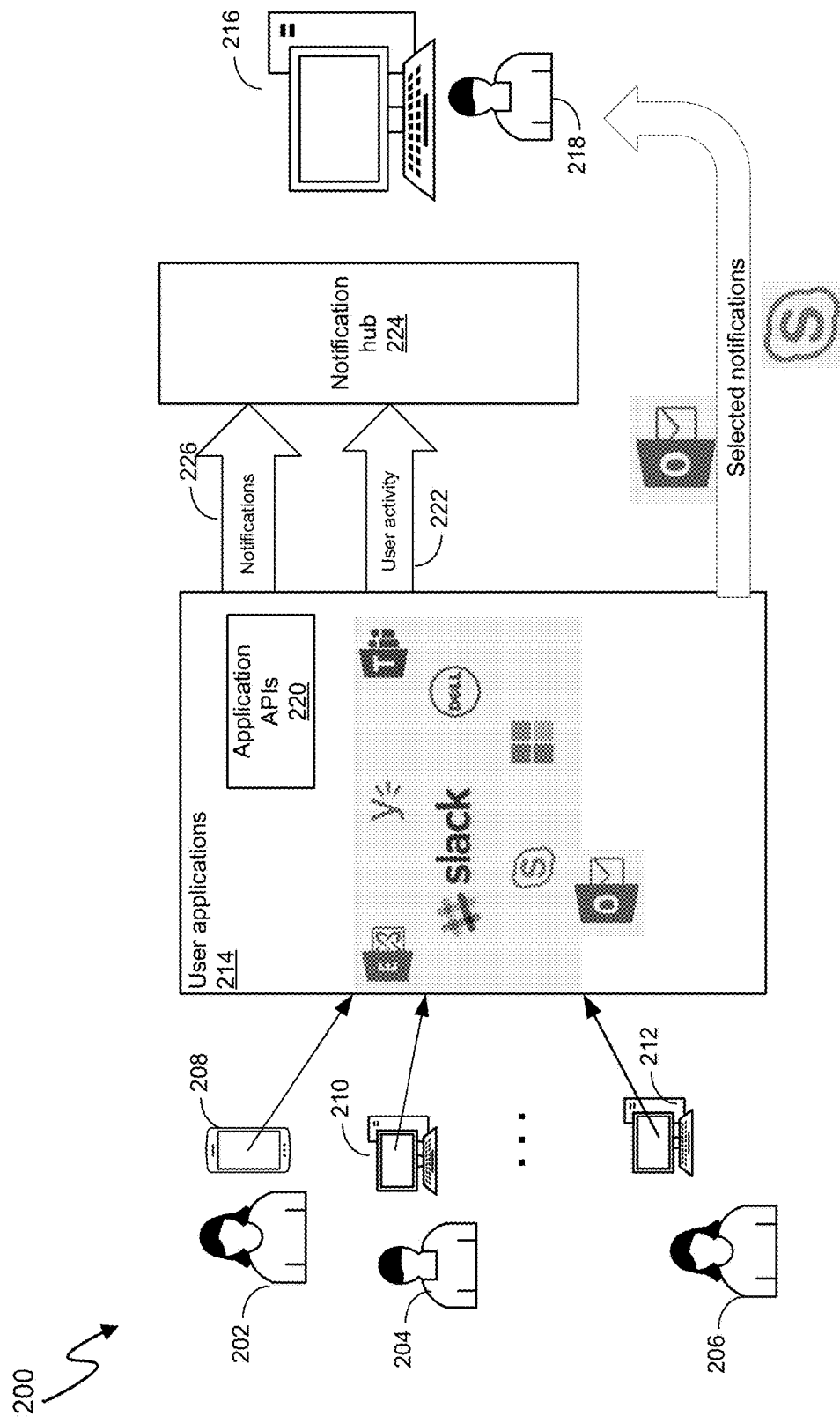
FIG. 2 shows one example of an electronic environment in which certain embodiments of the disclosed system may operate.

FIG. 2 shows one example of an electronic environment 200 in which certain embodiments of the disclosed system may operate. In this example, a number of different individuals 202, 204, and 206 are shown operating respective information handling devices 208, 210, 212. A variety of applications may be executed at each device 208, 210, and 212, such as email applications, conferencing applications, web applications, etc. In the generalized electronic environment 200 shown in FIG. 2, the devices 218, 210, and 212 may communicate with user applications 214 executed by an information handling system 216 that is operated by a user 218. Communications between the devices and information handling system may take place over a wired network, a wireless network, the Internet, or other communication medium.

In certain embodiments, the user applications 214 are configured with respective application APIs 220, which communicate user activity information 222 to a notification hub 224. In certain embodiments, the notification hub 224 intercepts notifications 226 generated by user applications 214, assesses the busyness of the user 218 based on the application APIs 220, and assesses the importance of the notification using, for example, context information included in the notification. If the notification hub 224 determines that a notification meets a notification threshold based on certain busyness and importance criterion, the notification is selected and allowed to interrupt user 218 at the information handling system 216. In certain embodiments, notifications that are not allowed to interrupt the user 218 may be stored in a notification queue for reassessment by the notification hub 224 at a later time. In certain embodiments, the reassessment occurs periodically so long as there are notifications stored in the notification queue. In certain embodiments, the reassessment occurs when the busyness of the user drops by a predetermined amount and/or reaches a predetermined threshold.

Figure 3:
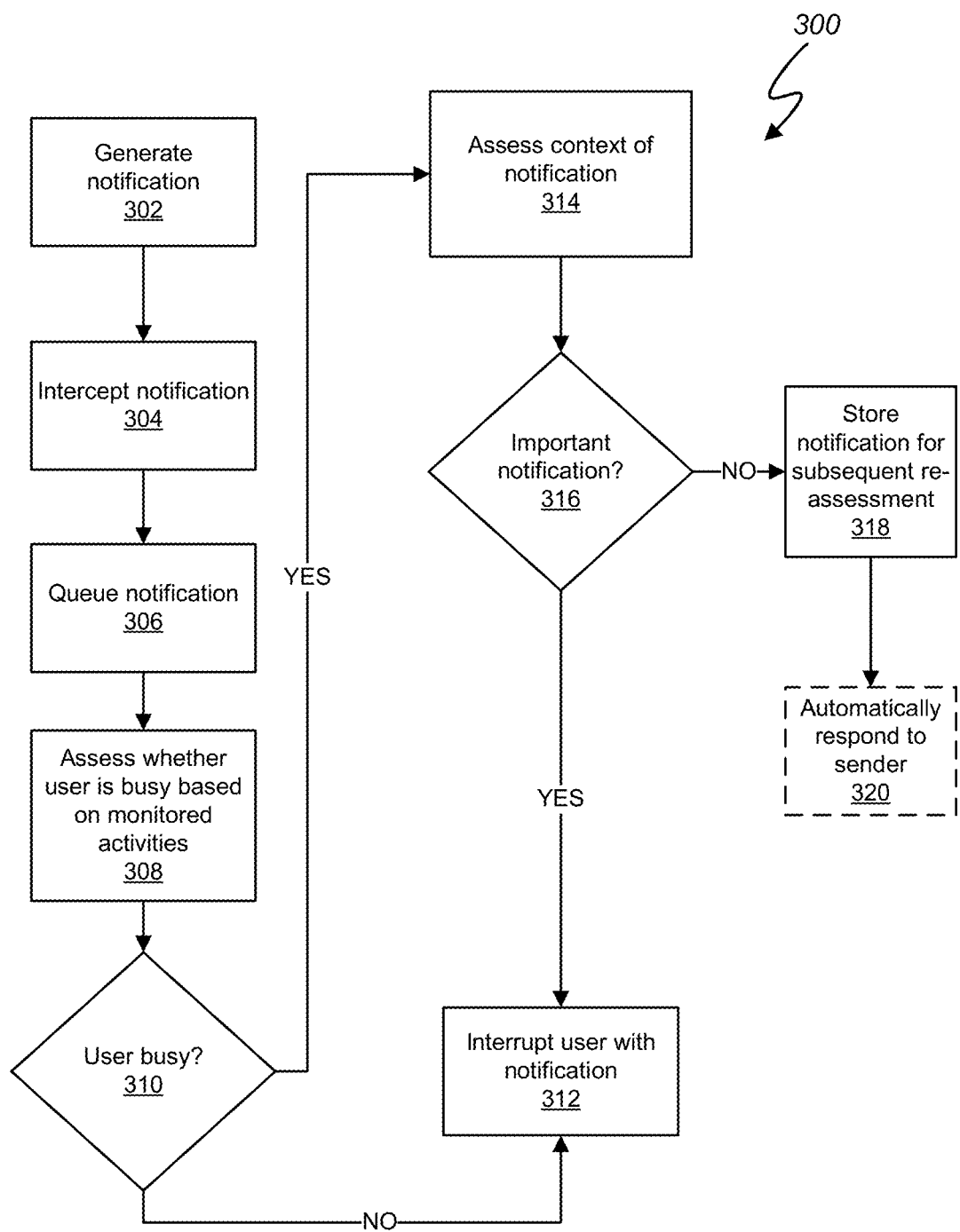
FIG. 3 is a flowchart of exemplary operations that may be executed by certain embodiments of the disclosed system.

FIG. 3 is a flowchart 300 of exemplary operations that may be executed by certain embodiments of the disclosed system. In this example, a notification is generated at operation 302, intercepted at operation 304, and queued at operation 306. The notification may be generated by a variety of applications as described herein. In certain embodiments, all information associated with the notification is queued at operation 306. In certain embodiments, only selected information associated with the notification is queued at operation 306.

In this example, an assessment is made at operation 308 as to whether the user is busy based, for example, on interactions that take place between the user and the information handling system. As described herein, such interactions may be reported by APIs running in applications that are being executed by the user at the information handling system. At operation 310, a determination is made, based on the assessments occurring at operation 310, whether the user is too busy to be interrupted with notifications. If the user is not too busy to be interrupted, the user is interrupted with the notification at operation 312. Otherwise, an assessment of the context of the notification is undertaken at operation 314. The context assessment is used at operation 316 to determine whether the notification is important enough at operation 316 to interrupt the user despite the determination that the user is busy at operation 310. If the notification is important enough to override the busyness of the user, the user is interrupted with the notification at operation 312. Otherwise, the notification may be stored at operation 318 for subsequent reassessment. In certain embodiments, the system may be configured to automatically respond to a sender of the message generating the intercepted notification at operation 320 when the user is not interrupted with the corresponding notification. For example, the automatic response may include language conveying that the user is currently busy but will respond to the sender as soon as possible. Other automatic responses may be used depending on the context of the notification.

Figure 4:
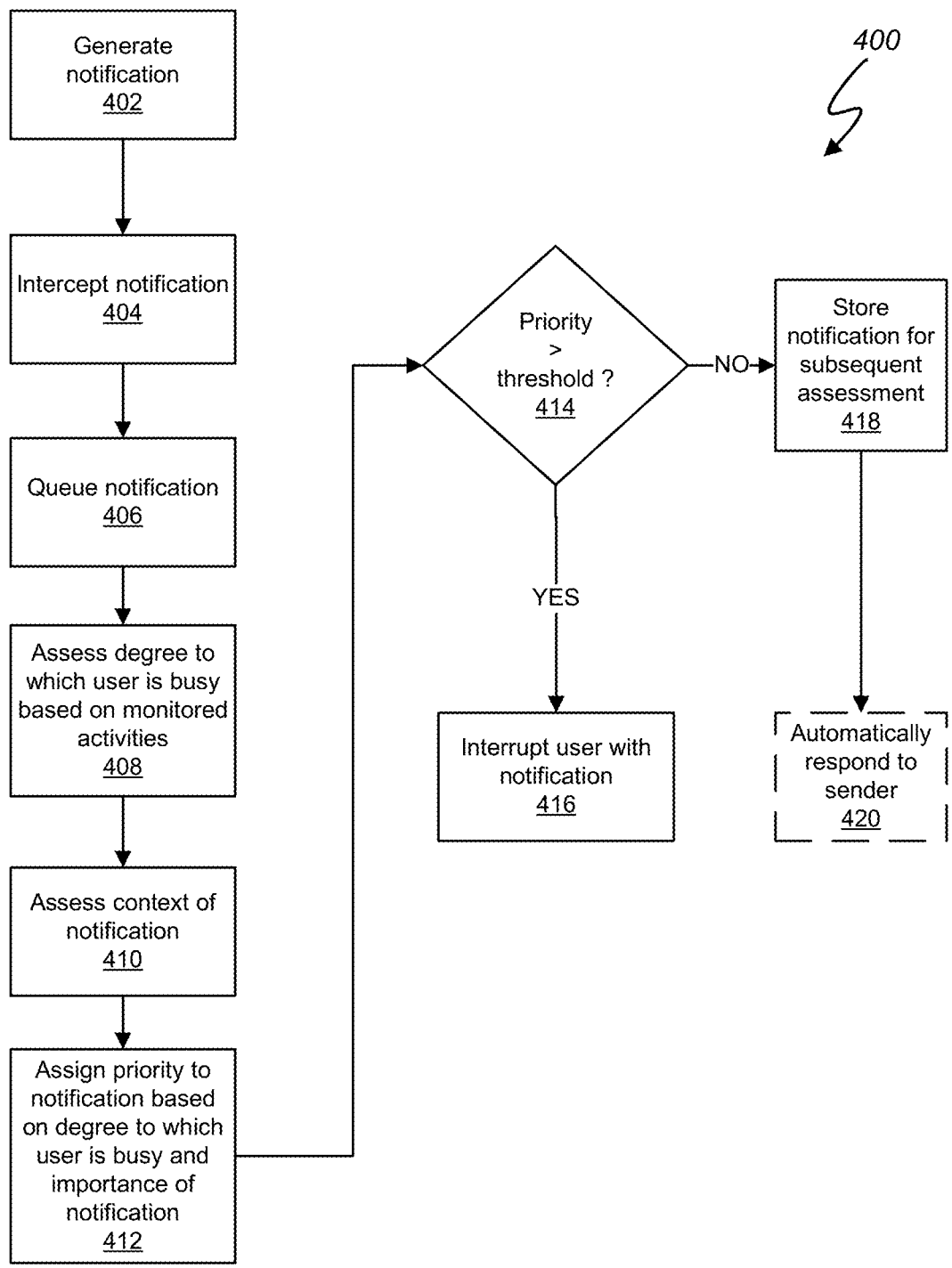
FIG. 4 is a flowchart of exemplary operations that may be executed by certain embodiments of the disclosed system.

FIG. 4 is a flowchart 400 of exemplary operations that may be executed by certain embodiments of the disclosed system. In this example, a notification is generated at operation 402, intercepted at operation 404, and queued at operation 406. The notification may be generated by a variety of applications as described herein. In certain embodiments, all information associated with the notification is queued at operation 406. In certain embodiments, only selected information associated with the notification is queued at operation 406.

In this example, an assessment of the degree to which a user is busy based on monitored activities is made at operation 408. At operation 410, an assessment of the context of the notification is undertaken to determine the importance of the notification. At operation 412, a priority is assigned to the notification based on the degree to which the user is busy and the importance of the notification. In certain embodiments, the priority assigned to the notification is compared to a threshold at operation 414 and, if the priority is greater than the threshold, the user is interrupted with the notification at operation 416. Otherwise, the notification may be stored in operation 418 for subsequent reassessment. In certain embodiments, the system may be configured to automatically respond to a sender of a message generating the intercepted notification at operation 420 when the user is not interrupted with the corresponding notification.

Figure 5:
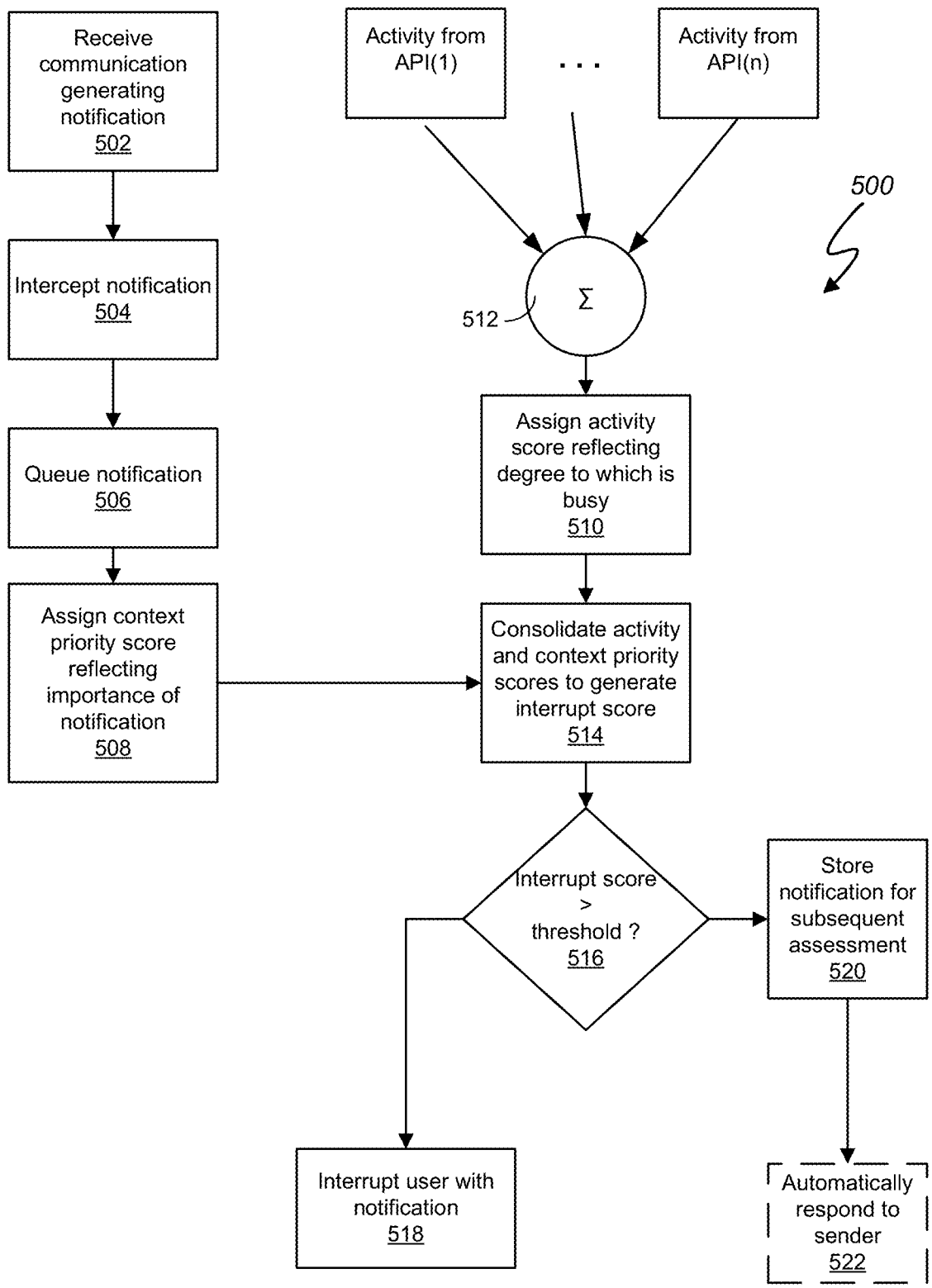
FIG. 5 is a flowchart of exemplary operations that may be executed by certain embodiments of the disclosed system.

FIG. 5 is a flowchart 500 of exemplary operations that may be executed by certain embodiments of the disclosed system. In this example, a notification is generated at operation 502, intercepted at operation 504, and queued at operation 506. The notification may be generated by a variety of applications as described herein. In certain embodiments, all information associated with the notification is queued at operation 506. In certain embodiments, only selected information associated with the notification is queued at operation 506. In this example, the importance of the notification is determined at operation 508 and represented as a context priority score.

An assessment of the degree to which a user is busy based on monitored activities is made at operation 510 and the notification is assigned a corresponding activity score. In the example shown in FIG. 5, activity information is accumulated from the APIs (shown here as API(1) through API(n), where n is an index corresponding to the number of APIs) at operation 512. In certain embodiments, the APIs may provide data suitable for use in calculations indicative of the degree of busyness of the user at the corresponding user application. As an example, each of the APIs may assess the busyness of the corresponding user applications on a scale of 1-10, 1-100, or other applicable range. In certain embodiments, the sum of the data is calculated at operation 512 and used to assign the activity score at operation 510. In certain embodiments, the data provided by the APIs is summed and averaged by the number of APIs reporting activity at operation 512. In certain embodiments, the data provided by the APIs may be weighted at operation 512, where the weight assigned to the data is based on which API is providing the data. Other manners of assigning an activity score at operation 510 using the data accumulated from the APIs at operation 512 may also be used.

In at least one embodiment, the activity score and context priority score are consolidated to generate an interrupt score at operation 514. The interrupt score may be derived from the context priority score and activity score in a number of different manners. In one example, the activity score and context priority score are added to one another to obtain the interrupt score. In another example, a weighted average of the activity score and context priority score are used to obtain the interrupt score. In certain embodiments, the context priority score and activity score may be normalized during the consolidation to obtain the interrupt score. It will be recognized, in view of the present disclosure, that the interrupt score may be obtained in a variety of different manners using the context priority score and activity score.

At operation 516, the interrupt score is compared to a threshold. If the interrupt score meets and/or exceeds the threshold, the user is interrupted with the notification at operation 518. Otherwise, certain embodiments store the notification at operation 520 for subsequent reassessment. In certain embodiments, an automatic response is sent to the sender of a communication giving rise to the generated notification at operation 522.

The threshold may be determined in a number of different manners. In one example, the threshold may be rule based. In another example, the threshold may be calculated using Artificial Intelligence or Machine Learning (supervised or unsupervised) models based on historic behaviors and organizational service level agreement rules. It will be recognized, in view of the present disclosure, that the threshold may be obtained in a variety of different manners either rule based or using Artificial Intelligence, Machine Learning models in conjunction with the context priority score and activity score."

Figure 6:
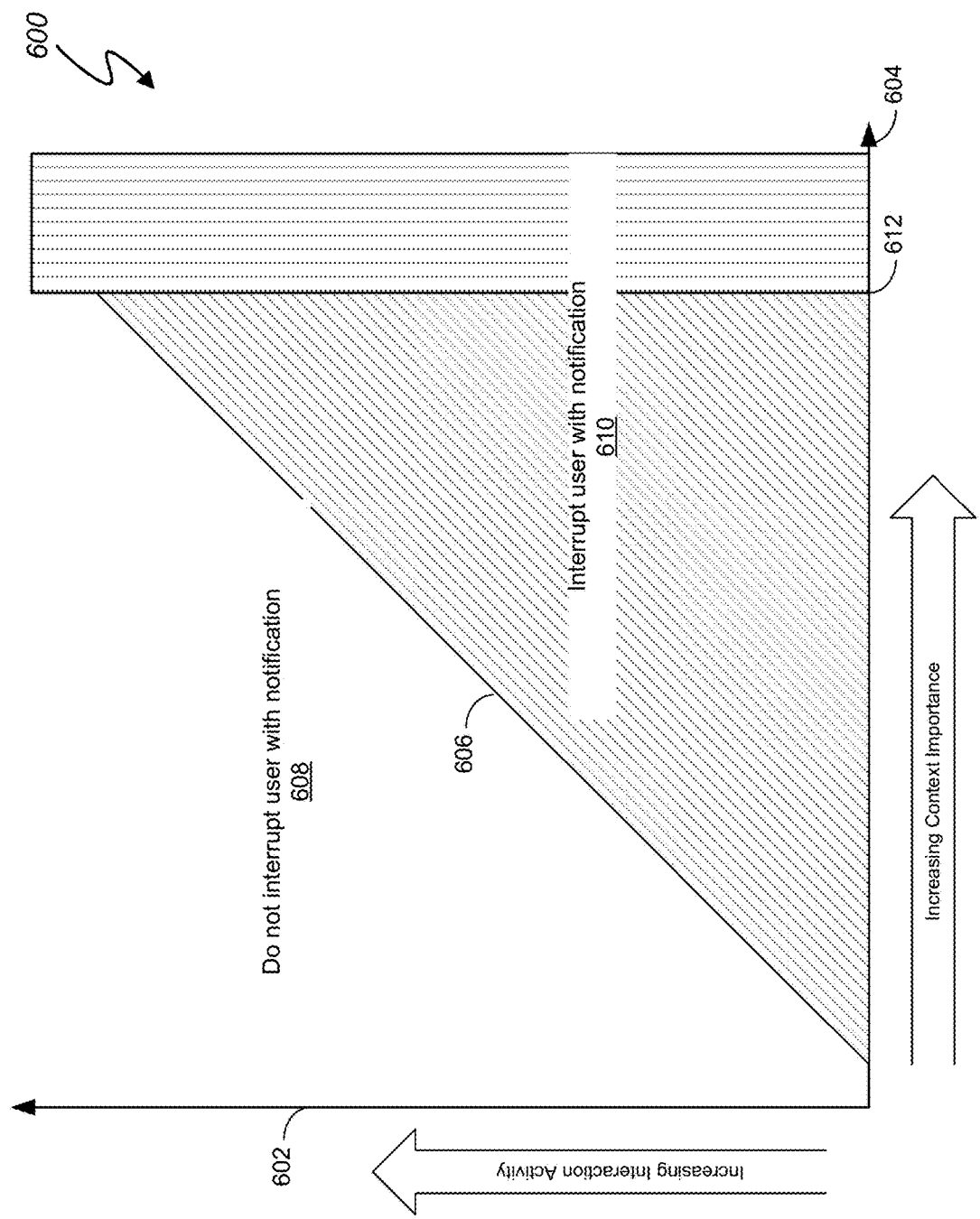
FIG. 6 is a graph showing one example of the relationship between interaction activity and context importance that may be implemented in certain embodiments of the disclosed system.

FIG. 6 is a graph 600 showing one example of the relationship between interaction activity and context importance that may be implemented in certain embodiments of the disclosed system. In this example, the interaction activity, shown on axis 602, and context importance, shown on axis 604, are independent variables. As further shown in FIG. 6, line 606 divides the graph 600 between region 608 in which the user is not interrupted with the notification, and region 610 in which the user is interrupted with the notification. As shown by the graphical relationship, higher levels of context importance for the notification are required before the user is interrupted with the notification with increasing levels of busyness of the user. In certain embodiments, the user is always interrupted with the notification, no matter how busy the user may be, if the context importance exceeds the threshold value shown at line 612.

Figure 7:
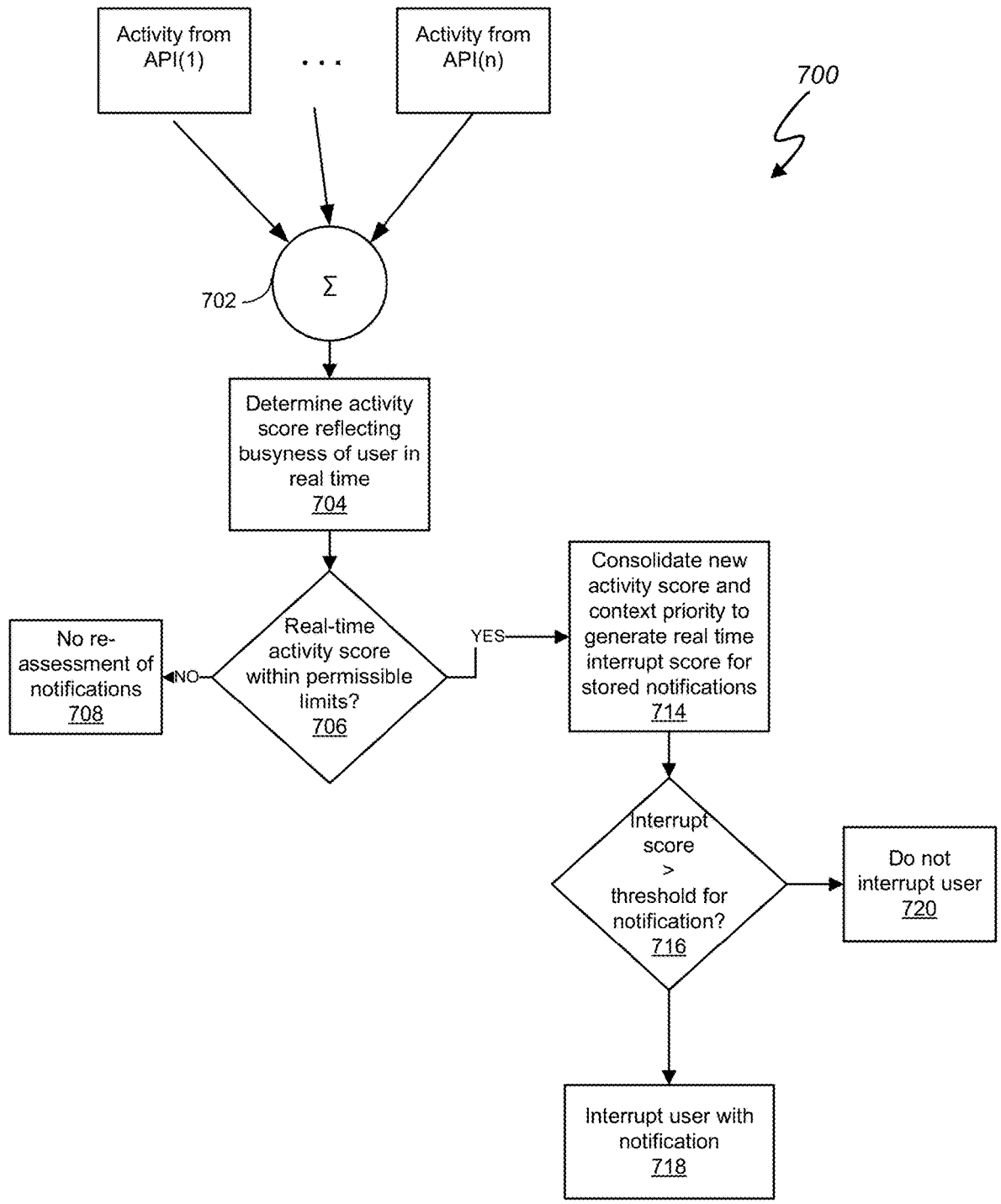
FIG. 7 is a flowchart of exemplary operations that may be executed by certain embodiments of the disclosed system in the reassessment of notifications in response to changes in the busyness of the user.

FIG. 7 is a flowchart 700 of exemplary operations that may be executed by certain embodiments of the disclosed system in the reassessment of notifications in response to changes in the busyness of the user. In at least one embodiment, an assessment of the degree to which a user is busy is monitored in real-time. In certain embodiments, the assessment of the degree to which the user is busy is based on monitored activities at operation 702. In the example shown in FIG. 7, activity information is accumulated from the APIs (shown here as API(1) through API(n), where n is an index corresponding to the number of APIs) at operation 704. In certain embodiments, the APIs may provide data suitable for use in calculations indicative of the degree of busyness of the user at the corresponding user application. As an example, each of the APIs may assess the busyness of the corresponding user applications on a scale of 1-10, 1-100, or other applicable range. In certain embodiments, the sum of the data is calculated at operation 702 and used to assign a real-time activity score at operation 704. In certain embodiments, the data provided by the APIs is summed and averaged by the number of APIs reporting activity at operation 512. In certain embodiments, the data provided by the APIs may be weighted at operation 512, where the weight assigned to the data is based on which API is providing the data. Other manners of assigning an activity score at operation 510 using the data accumulated from the APIs at operation 512 may also be used.

In at least one embodiment, the queued notifications/interrupts are processed and presented to the user when the user activity score is within permissible limits In the illustrated example, the activity score reflecting busyness of the user is determined in real-time at operation 704. In certain embodiments, if the real-time activity score is not within permissible limits, no reassessment of notifications is needed as shown at operation 708. Otherwise, the real-time activity score is consolidated with the context priority of one or more queued notifications at operation 714 to generate a real-time interrupt score for the notification. If the real-time interrupt score is greater than the threshold needed for notification at operation 716, the user is interrupted with the notification at operation 718. Otherwise, the user is not interrupted with the notification at operation 720 and, in certain embodiments, the notification remains in the notification queue.

As will be appreciated by one skilled in the art, the disclosed system may be embodied as a method, system, or computer program product. Accordingly, embodiments of the invention may be implemented in hardware, in software (including firmware, resident software, micro-code, etc.) or in an embodiment combining software and hardware. Furthermore, the present invention may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

What is claimed is:

1. A computer-implemented method for adaptively interrupting a user with communication notifications at an information handling system, comprising:

receiving a communication for a user at the information handling system;

intercepting a notification relating to the received communication;
assessing an importance of the notification using contextual information associated with the notification;
assessing busyness of the user at the information handling system by actively monitoring interactions between the user and multiple user applications currently executed at the information handling system, wherein assessing the busyness of the user at the information handling system includes
 detecting user interactions with the multiple user applications currently executed at the information handling system using application program interfaces respectively associated with the multiple user applications, wherein the user interactions detected by an application programming interface of a user program includes at least one of
 a current state of the user application,
 a number of open windows of the user application,
 keyboard activity associated with the user application, and
 a number of keystrokes per unit time entered by the user application,
 determining user activity levels associated with the multiple user applications currently executed at the information handling system based on the detected user interactions,
 receiving the user activity levels at a notification prioritizer, and
 generating an activity score at the notification prioritizer based on the user activity levels received from the application programming interfaces of the multiple user applications, wherein
  the activity score is determined using a weighting of the activity levels, and
  the activity score corresponds to the busyness of the user at the information handling system; and
selectively interrupting the user with the notification based on the activity score and the importance of the notification.

2. The computer-implemented method of claim 1, further comprising:
 interrupting the user with the notification when the activity score indicates that the busyness of the user at the information handling system is below a threshold.

3. The computer-implemented method of claim 1, wherein assessing the context of the notification includes one or more operations comprising:
 identifying an originator of the received communication generating the notification;
 identifying a time at which the received communication generating the notification was received at the information handling system;
 identifying a user application that received the communication generating the notification;
 identifying recipients of the received communication generating the notification; and
 comparing one or more of the originator of the received communication, the time at which the communication was received, recipients of the received communication, and user application that received the communication with predetermined originator, recipient, time and user application criterion to generate a context priority score.

4. The computer-implemented method of claim 3, further comprising:
 consolidating the activity score and context priority score to generate an interrupt score;
 interrupting the user with the notification if the interrupt score meets a notification threshold; and
 storing the notification for future reassessment if the interrupt score fails to meet the notification threshold.

5. The computer-implemented method of claim 4, further comprising:
 generating the activity score in real-time;
 generating a new interrupt score using the real-time activity score for a notification previously stored for future reassessment; and
 interrupting the user with the notification if the new interrupt score meets the notification threshold.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
 receiving a communication for a user at an information handling system;
 intercepting a notification relating to the received communication;
 assessing an importance of the notification using contextual information associated with the notification;
 assessing busyness of the user at the information handling system by actively monitoring interactions between the user and multiple user applications currently executed by the user at the information handling system, wherein assessing the busyness of the user at the information handling system includes
  detecting user interactions with the multiple user applications currently executed at the information handling system using application program interfaces respectively associated with the multiple user applications, wherein the user interactions detected by an application programming interface of a user program includes at least one of
   a current state of the user application,
   a number of open windows of the user application,
   keyboard activity associated with the user application, and
   a number of keystrokes per unit time entered by the user application,
  determining user activity levels associated with the multiple user applications currently executed at the information handling system based on the detected user interactions,
  receiving the user activity levels at a notification prioritizer, and
  generating an activity score at the notification prioritizer based on the user activity levels received from the application programming interfaces of the multiple user applications, wherein
   the activity score is determined using a weighting of the activity levels, and
   the activity score corresponds to the degree of busyness of the user at the information handling system; and
 selectively interrupting the user with the notification based on the activity score and the importance of the notification.

7. The system of claim 6, wherein the instructions are further configured for:
  interrupting the user with the notification when the activity score indicates that the busyness of the user at the information handling system is below a threshold.

8. The system of claim 6, wherein
  assessing the context of the notification includes one or more operations comprising:
    identifying an originator of the received communication generating the notification;
    identifying recipients of the received communication generating the notification;
    identifying a time at which the received communication generating the notification was received at the information handling system;
    identifying a user application that received the communication generating the notification; and
    comparing one or more of the originator of the received communication, the time at which the communication was received, recipients of the received communication, and user application that received the communication with predetermined originator, recipient, time and user application criterion to generate a context priority score.

9. The system of claim 8, wherein the instructions are further configured for:
  consolidating the activity score and context priority score to generate an interrupt score;
  interrupting the user with the notification if the interrupt score meets a notification threshold; and
  storing the notification for future reassessment if the interrupt score fails to meet the notification threshold.

10. The system of claim 9, wherein the instructions are further configured for:
  generating the activity score in real-time;
  generating a new interrupt score for a notification previously stored for future reassessment using the real-time activity score; and
  interrupting the user with the notification if the new interrupt score meets the notification threshold.

11. A non-transitory, computer-readable storage medium embodying computer program code, the computer program code comprising computer executable instructions configured for:
  receiving a communication for a user at an information handling system;
  intercepting a notification relating to the received communication;
  assessing importance of the notification using contextual information associated with the notification;
  assessing busyness of the user at the information handling system by actively monitoring interactions between the user and multiple user applications currently executed at the information handling system, wherein assessing the busyness of the user at the information handling system includes
    detecting user interactions with the multiple user applications currently executed at the information handling system using application program interfaces respectively associated with the multiple user applications, wherein the user interactions detected by an application programming interface of a user program includes at least one of
      a current state of the user application,
      a number of open windows of the user application,
      keyboard activity associated with the user application, and
      a number of keystrokes per unit time entered by the user application,
    determining user activity levels associated with the multiple user applications currently executed at the information handling system based on the detected user interactions,
    receiving the user activity levels at a notification prioritizer, and
    generating an activity score at the notification prioritizer based on the user activity levels received from the application programming interfaces of the multiple user applications, wherein
      the activity score is determined using a weighting of the activity levels, and
      the activity score corresponds to the busyness of the user at the information handling system; and
  selectively interrupting the user with the notification based on the activity score and the importance of the notification.

12. The non-transitory, computer-readable storage medium of claim 11, wherein the instructions are further configured for:
  interrupting the user with the notification when the activity score indicates that the busyness of the user at the information handling system is below a threshold.

13. The non-transitory, computer-readable storage medium of claim 11, wherein
  assessing the context of the notification includes one or more operations comprising:
    identifying an originator of the received communication generating the notification;
    identifying a time at which the received communication generating the notification was received at the information handling system;
    identifying recipients of the received communication generating the notification;
    identifying a user application that received the communication generating the notification; and
    comparing one or more of the originator of the received communication, the time at which the communication was received, recipients of the received communication, and user application that received the communication with predetermined originator, recipient, time and user application criterion to generate a context priority score.

14. The non-transitory, computer-readable storage medium of claim 11, wherein the instructions are further configured for:
  consolidating the activity score and context priority score to generate an interrupt score;
  interrupting the user with the notification if the interrupt score meets a notification threshold; and
  storing the notification for future reassessment if the interrupt score fails to meet the notification threshold.

* * * * *